United States Patent
Lee et al.

(10) Patent No.: US 9,760,473 B2
(45) Date of Patent: Sep. 12, 2017

(54) SYSTEM AND METHOD FOR VISUALIZING SOFTWARE PROGRAMS

(71) Applicant: Institute For Information Industry, Taipei (TW)

(72) Inventors: Shin-Jie Lee, Tainan (TW); Jonathan Lee, New Taipei (TW); Jing Fung Chen, New Taipei (TW)

(73) Assignee: Institute For Information Industry, Taipei (TW)

( * ) Notice: Subject to any disclaimer, the term of this patent is extended or adjusted under 35 U.S.C. 154(b) by 1 day.

(21) Appl. No.: 14/599,538

(22) Filed: Jan. 18, 2015

(65) Prior Publication Data

US 2016/0098272 A1    Apr. 7, 2016

(30) Foreign Application Priority Data

Oct. 2, 2014 (TW) .............................. 103134342 A (51) Int. Cl.
G06F 9/44 (2006.01)
G06F 9/45 (2006.01)
G06F 11/36 (2006.01)
G06F 11/32 (2006.01)

(52) U.S. Cl.
CPC ............ *G06F 11/3664* (2013.01); *G06F 8/77* (2013.01); *G06F 11/323* (2013.01); *G06F 11/366* (2013.01)

(58) Field of Classification Search
CPC ..... G06F 8/75; G06F 8/20–8/34; G06F 11/08; G06F 11/3664; G06F 8/77; G06F 11/323; G06F 11/366
See application file for complete search history.

(56) References Cited

U.S. PATENT DOCUMENTS

| | | | |
|---|---|---|---|
| 6,429,860 B1 * | 8/2002 | Hughes | G06F 11/323 345/418 |
| 7,934,192 B2 | 4/2011 | Shaw | |
| 8,904,389 B2 * | 12/2014 | Bingham | G06F 9/45533 345/440 |

(Continued)

FOREIGN PATENT DOCUMENTS

| | | |
|---|---|---|
| CN | 100527077 C | 8/2009 |
| CN | 101957757 A | 1/2011 |

(Continued)

OTHER PUBLICATIONS

Fabio Palomba, Mining Version Histories for Detecting Code Smells, 2013, pp. 1-28.*

(Continued)

*Primary Examiner* — Thuy Dao
*Assistant Examiner* — Mongbao Nguyen
(74) *Attorney, Agent, or Firm* — Skaar Ulbrich Macari, P.A.

(57) ABSTRACT

A system and a method for visualizing a software program are provided. The system is configured to store the software program and its change logs. The system is further configured to generate a visualization structure of the software program according to at least one of Data Clumps information, Divergence Change information and Shotgun Surgery information, and display the software program according to the visualization structure. The method is applied to the system to implement the operations.

10 Claims, 8 Drawing Sheets

(56) References Cited

U.S. PATENT DOCUMENTS

| | | | |
|---|---|---|---|
| 2004/0261054 A1* | 12/2004 | Colling | G06F 8/30 717/106 |
| 2006/0064674 A1* | 3/2006 | Olson | G06F 8/38 717/113 |
| 2007/0140142 A1* | 6/2007 | Shaw | G06F 8/20 370/254 |
| 2008/0163063 A1* | 7/2008 | Bonev | G06F 11/3664 715/734 |
| 2008/0228812 A1* | 9/2008 | Oglesby | G06F 8/20 |
| 2009/0319993 A1* | 12/2009 | Denver | G06F 8/24 717/121 |
| 2010/0114819 A1* | 5/2010 | Kim | A61L 9/015 707/616 |
| 2011/0214108 A1* | 9/2011 | Grunberg | G06F 11/3612 717/128 |
| 2012/0054714 A1* | 3/2012 | Novak | G06F 3/0482 717/105 |
| 2012/0297364 A1* | 11/2012 | Wehrwein | G06F 8/75 717/123 |
| 2013/0047140 A1* | 2/2013 | Shann | G06F 11/3664 717/128 |
| 2013/0097582 A1* | 4/2013 | Chandra | G06F 8/24 717/105 |
| 2014/0095548 A1* | 4/2014 | Chen | G06F 17/30398 707/797 |
| 2014/0137076 A1* | 5/2014 | Kohli | G06F 8/70 717/105 |
| 2014/0258968 A1* | 9/2014 | Brown | G06F 17/21 717/103 |
| 2015/0145854 A1* | 5/2015 | Deshpande | G06Q 10/06 345/418 |

FOREIGN PATENT DOCUMENTS

| | | |
|---|---|---|
| CN | 102385505 A | 3/2012 |
| TW | 201145015 A1 | 12/2011 |

OTHER PUBLICATIONS

D. Raj Kumar, Refactoring Framework for Instance Code Smell Detection, 2014, pp. 1-6.*

Felienne Hermans, Detecting and Visualizing Inter-worksheet Smells in Spreadsheets, 2012, pp. 441-450.*

Glauco de F. Carneiro, Identifying Code Smells with Multiple Concern Views, 2010, pp. 1-10.*

Ashok Kumar Behera, Analysis and Design of Software Visualization Tool for the Behavior of Object Oriented Programming, 2011, pp. 1-4.*

Emerson Murphy-Hill, An Interactive Ambient Visualization for Code Smells, 2010, pp. 1-10.*

Office Action to the corresponding Taiwan Patent Application rendered by the Taiwan Intellectual Property Office (TIPO) on May 5, 2016, 12 pages (including English translation).

* cited by examiner

FIG. 5

SYSTEM AND METHOD FOR VISUALIZING SOFTWARE PROGRAMS

PRIORITY

This application claims priority to Taiwan Patent Application No. 103134342 filed on Oct. 2, 2014, which is hereby incorporated by reference in its entirety.

FIELD

The present invention relates to a system and a method for processing software programs. More particularly, the present invention relates to a system and a method for visualizing software programs.

BACKGROUND

Software programs have become an essential technology for computer science and technology industries. To determine whether a software program can operate normally, various analysis and debugging operations have to be made. To facilitate the analysis and debugging of software programs, software visualization technologies have attracted much attention.

As the computational load and computational complexity increases, the scale of software programs have become increasingly larger. Correspondingly, it will be more difficult to analyze large-scale software programs. For example, problems such as insufficient program comments, lack of test codes or the like are often encountered during the analysis of large-scale software programs. In addition, a large-scale software program usually must be processed by a number of persons so that problems such as maintaining the integrity of joined codes and the habit of compiling codes or the like become great concern. Because of different habits of compiling programs, coupling and cohesion tend to arise in large-scale software programs. The term "coupling" generally refers to the relevance between a plurality of program modules in a software program, and the term "cohesion" generally refers to cohesion of a plurality of program codes in a single program module of a software program. However, conventional software visualization technologies are unable to effectively highlight regions where the coupling and cohesion occur in a large-scale software program.

Accordingly, it is important to provide an effective software visualization technology for large-scale software programs in the art.

SUMMARY

An objective of the present invention includes providing an effective software visualization technology for large-scale software programs.

To achieve the objective, certain embodiments of the present invention include a system for visualizing a software program. The system comprises a storage device, a processing device and a display device. The storage device is configured to store the software program and change logs thereof. The software program comprises a plurality of class codes. Each of the class codes comprises a plurality of method codes, and each of the method codes comprises a plurality of parameters. The processing device is configured to create a visualization structure of the software program according to at least one of Data Clumps information, Divergence Change information and Shotgun Surgery information. The processing device calculates correlations between attributes of the class codes to detect Data Clumps of the software program and obtain the Data Clumps information therefrom. The processing device calculates correlations between the method codes according to the change logs to detect Divergence Change of the software program and obtain the Divergence Change information therefrom. The processing device calculates correlations between the class codes according to the change logs to detect Shotgun Surgery of the software program and obtain the Shotgun Surgery information therefrom. The display device is configured to display the software program according to the visualization structure.

To achieve the objective, certain embodiments of the present invention include a method for visualizing a software program. The method comprises the following steps:

(a) enabling a storage device to store the software program and change logs thereof, wherein the software program comprises a plurality of class codes, each of the class codes comprises a plurality of method codes, and each of the method codes comprises a plurality of parameters;

(b) enabling a processing device to create a visualization structure of the software program according to at least one of Data Clumps information, Divergence Change information and Shotgun Surgery information, wherein the processing device calculates correlations between attributes of the class codes to detect Data Clumps of the software program and obtain the Data Clumps information therefrom, calculates correlations between the method codes according to the change logs to detect Divergence Change of the software program and obtain the Divergence Change information therefrom, and calculates correlations between the class codes according to the change logs to detect Shotgun Surgery of the software program and obtain the Shotgun Surgery information therefrom; and (c) enabling a display device to display the software program according to the visualization structure.

According to the above descriptions, the present invention provides a system and a method for visualizing a software program. The system and the method according to the present invention can create a visualization structure of a software program according to at least one of Data Clumps information, Divergence Change information and Shotgun Surgery information, and display the software program according to the visualization structure. Because Divergence Change is a main reason why cohesion occurs in a software program, regions where the cohesion occurs in the software program can be effectively highlighted in the visualization structure created by the present invention according to the Divergence Change information. Additionally, because Data Clumps and Shotgun Surgery are main reasons why coupling occurs in a software program, regions where the coupling occurs in the software program can be effectively highlighted in the visualization structure created by the present invention according to the Data Clumps information and the Shotgun Surgery information. Accordingly, the present invention can provide an effective software visualization technology for large-scale software programs.

The detailed technology and preferred embodiments implemented for the present invention are described in the following paragraphs accompanying the appended drawings for persons skilled in the art to well appreciate the features of the claimed invention.

BRIEF DESCRIPTION OF THE DRAWINGS

A brief description of the drawings will be made as follows, but this is not intended to limit the present invention.

DETAILED DESCRIPTION

The content of the present invention will be explained with reference to example embodiments thereof. However, the following example embodiments are not intended to limit the present invention to any specific embodiments, examples, environment, applications, structures, process flows, or steps as described in these example embodiments. In other words, the description of the following example embodiments is only for the purpose of explaining the present invention rather than to limit the present invention.

In the drawings, elements not directly related to the present invention are all omitted from the depiction. Dimensional relationships among individual elements are illustrated only for ease of description but not to limit the actual scale.

Figure 1:
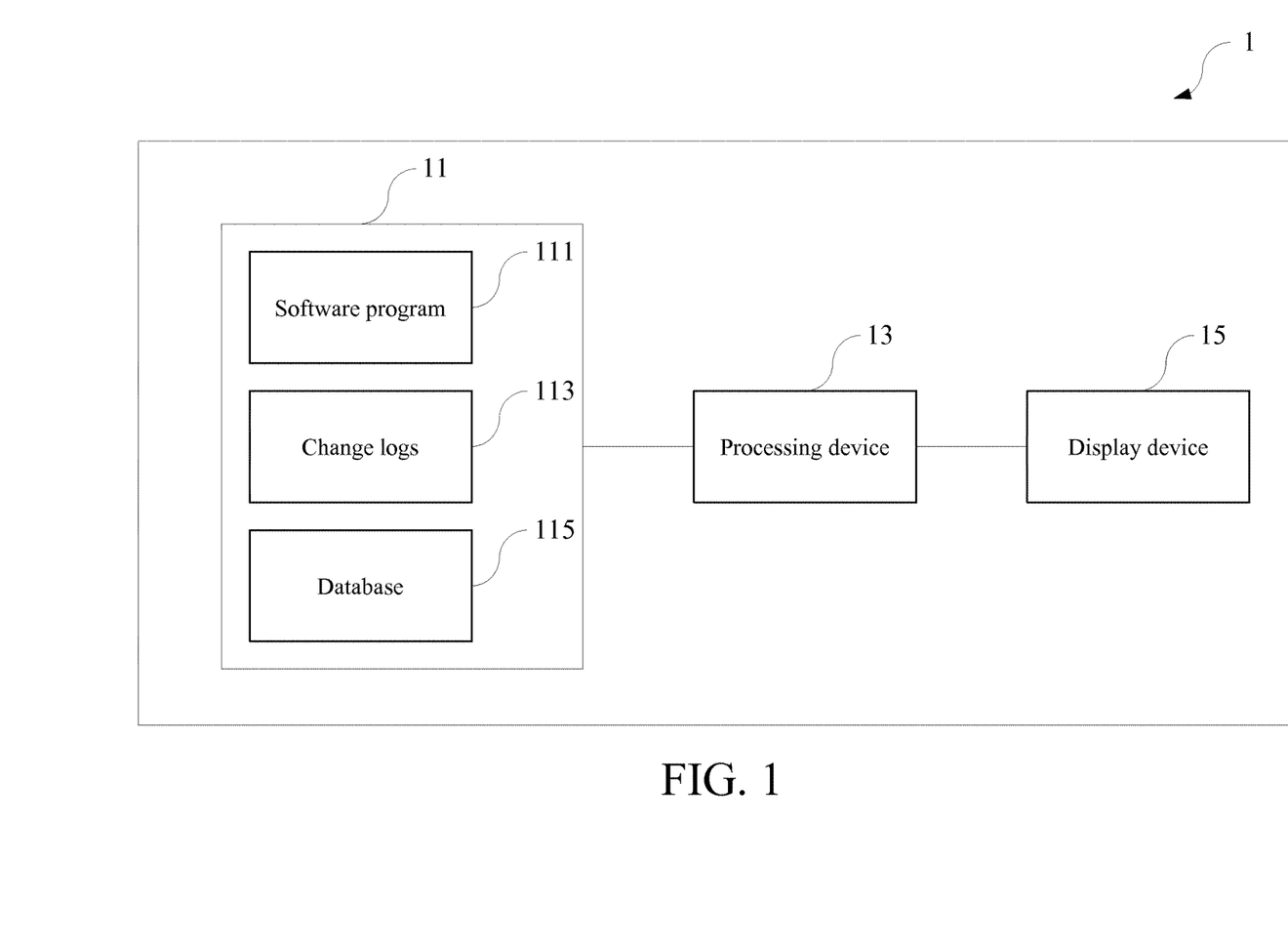
FIG. 1 is a schematic structural view of a system for visualizing a software program according to an embodiment of the present invention.

An embodiment of the present invention (briefly called "a first embodiment") is a system for visualizing a software program. FIG. 1 is a schematic structural view of the system. As shown in FIG. 1, the system 1 may comprise a storage device 11, a processing device 13 and a display device 15. The storage device 11, the processing device 13 and the display device 15 may be electrically connected with each other directly or indirectly and communicate with each other. The system 1 may be a computer system or a cloud system.

Figure 2:
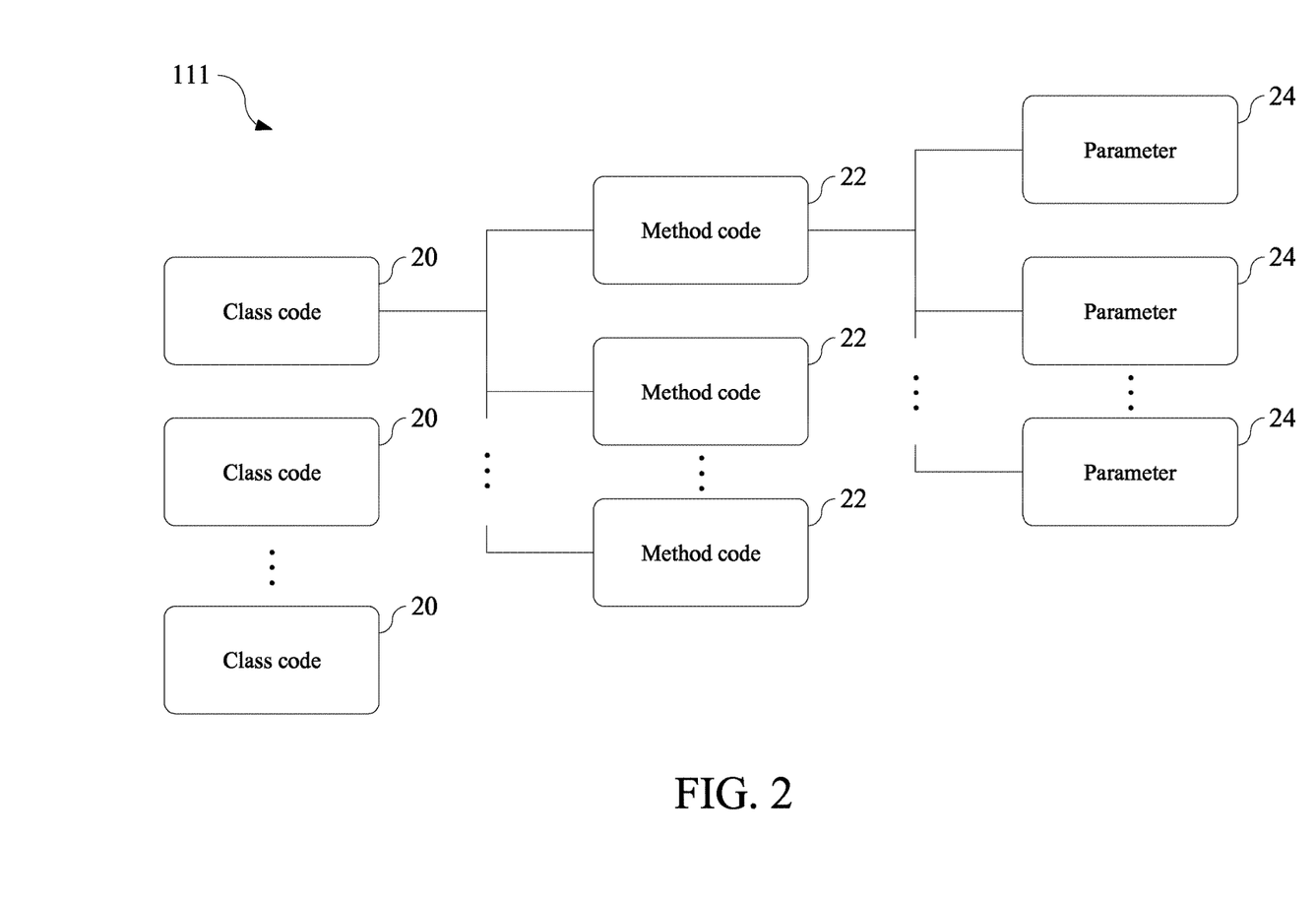
FIG. 2 is a schematic view illustrating the components of a software program according to an embodiment of the present invention.

The storage device 11 is configured to store at least one software program 111, which may be generated by various different program compiling tools. FIG. 2 is a schematic view illustrating the components of the software program 111. As shown in FIG. 2, like common software programs, the software program 111 may substantially comprise a plurality of class codes 20, each of the class codes may substantially comprise a plurality of method codes 22, and each of the method codes may substantially comprise a plurality of parameters 24. Each of the class codes 20 may have at least one attribute, and the at least one attribute may correspond to the class code 20, the method codes 22 comprised in the class code 20 and/or the parameters 24 comprised in each of the method codes.

The storage device 11 may be further configured to store change logs 113 of the software program 111. The change logs 113 are configured to record historical logs of the changes once performed on the class codes 20, the method codes 22 and the parameters 24 respectively, including the historical logs of modifications, updating, debugging or the like that have once been performed.

Optionally, the storage device 11 may further comprise a database 115. The database 115 may store at least one open software program corresponding to the software program 111. Specifically, the at least one open software program is related to the software program 111, and is an open software program (e.g., open codes provided by the Android system, the apache system and the Chrome system) that are generally recognized by experts. These open codes may be open codes of nightly builds or may be open codes released through standard formulation. The at least one open software program stored in the database 115 may comprise a plurality of class codes 20, each of the class codes may substantially comprise a plurality of method codes 22, and each of the method codes may substantially comprise a plurality of parameters 24. Each of the class codes may have at least one attribute, which may correspond to the class code, the method codes comprised in the class code and/or parameters comprised in each of the method codes. However, the at least one open software program stored in the database 115 does not comprise the software program 111 itself.

In a case where the storage device 11 comprises the database 115, the processing device 13 may preliminarily analyze the software program 111 according to the at least one open software program stored in the database 115. Specifically, the processing device 13 may calculate the number of columns of each of the class codes, the number of columns of each of the method codes, the number of parameters comprised in each of the method codes and the number of attributes that are identical among different class codes in the at least one open software program stored in the database 115. Then, the processing device 13 may define at least one threshold according to the number of columns of each of the class codes, the number of columns of each of the method codes, the number of parameters comprised in each of the method codes and the number of attributes that are identical among different class codes in the at least one open software program.

For example, the processing device 13 may calculate a statistical parameter (e.g., an average value and/or a standard deviation) according to the number of columns of each of the class codes, the number of columns of each of the method codes, the number of parameters comprised in each of the method codes and the number of attributes that are identical among different class codes in the at least one open software program respectively. Then, the processing device 13 may define a threshold according to each of the statistical parameters respectively, or define a common threshold according to these statistical parameters.

After having defined the at least one threshold, the processing device 13 may determine whether a corresponding portion in the software program 111 exceeds the at least one threshold. For example, the processing device 13 may define a threshold according to the number of columns of a certain class code in the at least one open software program, and then determine whether the number of columns of the corresponding class code 20 in the software program 111 exceeds the threshold. Similarly, the processing device 13 may define a threshold according to the number of columns of a certain method code, the number of columns of a certain method code, the number of parameters comprised in a certain method code or the number of attributes that are identical among different class codes in the at least one open software program, and then determine whether the number of columns of the corresponding method code 22, the number of parameters 24 comprised in the corresponding method code 22, or the number of attributes that are identical among the corresponding different class codes 20 exceeds the threshold. Because what stored in the database is an open software program generally recognized by the experts, the possibility that the coupling, cohesion or other problems would occur in the software program 111 is relatively high if the corresponding portion in the software program 111 exceeds the threshold defined above.

After having determined that the corresponding portion in the software program 111 exceeds the at least one threshold, the processing device 13 may create a visualization structure of the software program 111 according to at least one of Data Clumps information, Divergence Change information and Shotgun Surgery information. However, in a case where the storage device 11 does not comprise the database 115, the processing device 13 may also create a visualization structure of the software program 111 directly according to at least one of the Data Clumps information, the Divergence Change information and the Shotgun Surgery information. After the visualization structure is created by the processing device 13, the display device 15 may be used to display the software program 111 according to the visualization structure. The display device 15 may be one of the known display devices, such as an LCD, a diode display, a touch display and etc.

The Data Clumps information may comprise various information of Data Clumps that occur in the software program 111. Data Clumps generally refer to a phenomenon in which the same attribute occurs in different class codes 20 of the software program 111. Data Clumps is also a main reason why coupling occurs in the software program 111. To obtain the Data Clumps information, the processing device 13 may calculate correlations between the attributes of the class codes 20 of the software program 111 to detect whether there are Data Clumps in the software program 111.

The Divergence Change information comprises various information of Divergence Change that occurs in the software program 111. Divergence Change generally refers to a phenomenon in which a plurality of method codes 22 having the same change occur in a certain class code 20 of the software program 111, and it is also a main reason why cohesion occurs in the software program 111. For example, the reason why a plurality of method codes 22 have a same change in a class code 20 is probably that the functions, such as calling, referring and so on, usually create some dependency between different method codes 22 or between the parameters 24 comprised in different method codes 22. To obtain the Divergence Change information, the processing device 13 may calculate correlations between method codes 22 comprised in each of the class codes 20 in the software program 111 according to the change logs 113 to detect whether Divergence Change occurs in the software program 111. Substantially, various known correlation algorithms may be adopted to calculate the correlations between the method codes 22 comprised in each of the class codes 20.

The Shotgun Surgery information comprises various information of Shotgun Surgery that occurs in the software program 111. Shotgun Surgery generally refers to a phenomenon in which different class codes 20 in the software program 111 have the same change, and it is also a main reason why coupling occurs in the software program 111. For example, the reason why a plurality of class codes 20 have the same change is probably that the functions, such as calling, referring, and so on, usually create dependency between different class codes 20, between the method codes 22 comprised in different class codes 20, and/or between the parameters 24 comprised in the method codes 22 of the different class codes 20. To obtain the Shotgun Surgery information, the processing device 13 may calculate correlations between the class codes 20 comprised in the software program 111 according to the change logs 113 to detect whether Shotgun Surgery occurs in the software program 111.

Substantially, various known correlation algorithms may be adopted to calculate the correlations between the class codes 20.

Optionally, the processing device 13 may calculate the correlations between the attributes of the class codes 20, the correlations between the method codes 22 and the correlations between the class codes 20 in the software program 111 in series or in parallel. When they are calculated in series, the sequence of calculating the three kinds of correlations may be altered as needed.

Optionally, the visualization structure created by the processing device 13 for the software program 111 may be a hierarchical structure. The hierarchical structure may comprise a plurality of layers, which are used to represent information corresponding to different layers. For example, the class codes 20 comprised in the software program 111 may correspond to a first layer of the hierarchical structure. The method codes 22, the parameters 24 and the related attributes thereof comprised in the software program 111 may correspond to a second layer of the hierarchical structure.

Figure 3A:
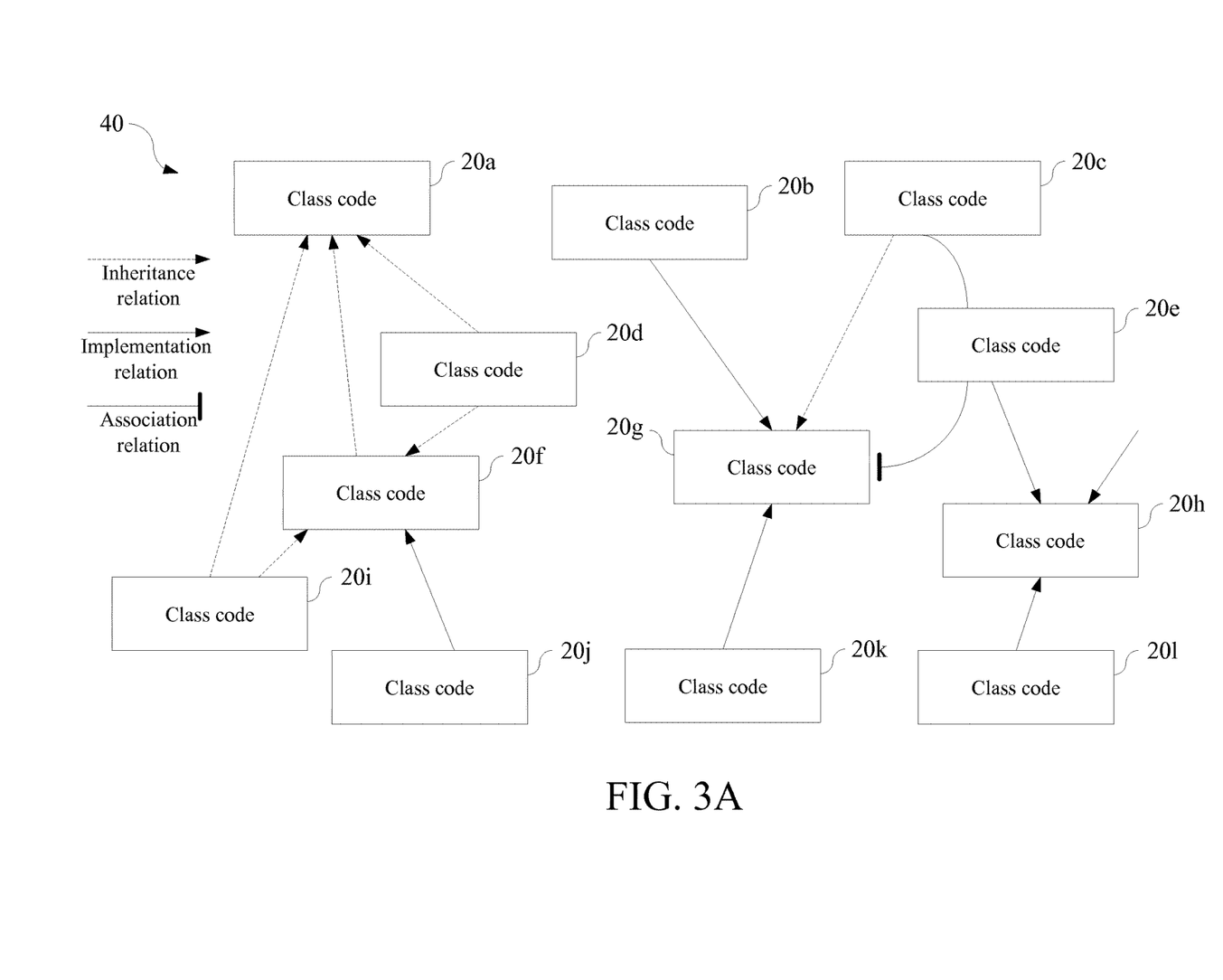
FIG. 3A is a schematic view illustrating a first layer of a visualization structure of a software program according to an embodiment of the present invention.
Figure 3B:
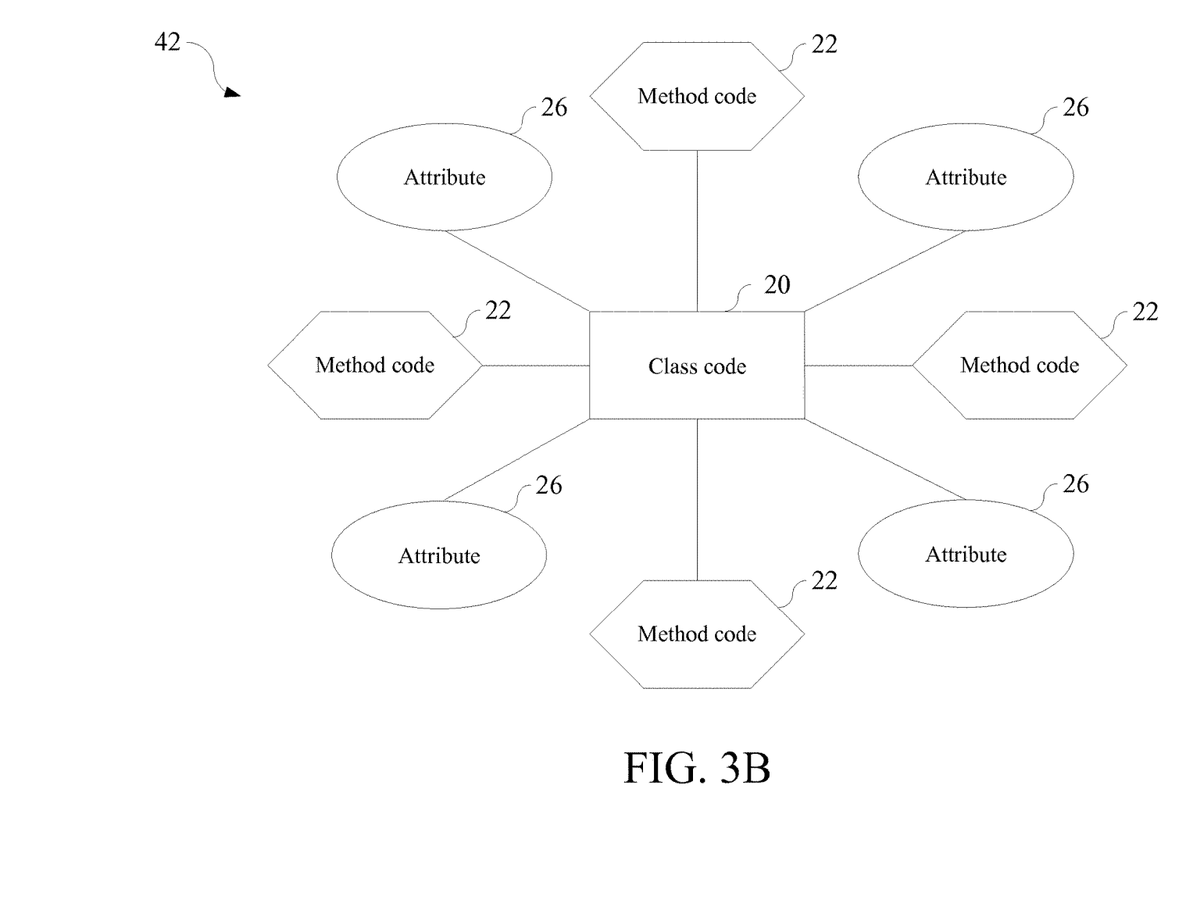
FIG. 3B is a schematic view illustrating a second layer of a visualization structure of the software program according to an embodiment of the present invention.

Optionally, the display device 15 may display the visualization structure created by the processing device 13 for the software program 111 according to different colors, frame lines, connection lines and/or outlines. FIG. 3A and FIG. 3B will be taken as an example to describe the visualization structure created by the processing device 13 for the software program 111. FIG. 3A is a schematic view illustrating a first layer of a visualization structure of the software program 111, while FIG. 3B is a schematic view illustrating a second layer of a visualization structure of the software program 111.

As shown in FIG. 3A, a first layer 40 of a visualization structure of the software program 111 comprises a plurality of class codes 20a~201; and each of the class codes 20a~201 is shown in a rectangular outline. The correlations between the class codes 20a~201 may be represented by connection lines. For example, solid lines represent implementation relations and association relations, while dotted lines represent inheritance relations. The solid lines may be further subdivided according to different endpoint symbols used. For example, arrows represent implementation relations and straight lines represent association relations. Additionally, an end that has an endpoint symbol of each of the solid lines and the dotted lines may represent the reference direction. As shown in FIG. 3A, the class code 20g and the class code 20c have a connection relation according to the type of the connection line. That is, the class code 20c is considered as a reference variable in the class code 20g. For example, if the class code 20g corresponds to a phone, then the class code 20c corresponds to buttons on the phone. Additionally, the display device 15 may use different colors to represent alerting degrees of the class code 20b. For example, a green background may be used to represent that it is safe, a yellow background may be used to represent that attention should be paid, and a red background may be used to represent that it is dangerous. The number, positions, presentation manners and connection manners of the class codes 20a~201 shown in FIG. 3A are only described as an exemplary example of this embodiment, but are not intended to limit the present invention.

As shown in FIG. 3B, a second layer 42 of a visualization structure of the software program 111 presents the method codes 22 and the attributes 26 comprised in a certain class code 20 shown in FIG. 3A. Each of the method codes 22 is displayed in a hexagonal outline, and each of the attributes 26 is displayed in an elliptical outline. The number of parameters comprised in each method code 22 may be represented by different colors or types of the frame lines. For example, a hexagon enclosed by red frame lines represents that the corresponding method code 22 comprises a relatively large number of parameters, and a hexagon enclosed by green frame lines represents that the corresponding method code 22 comprises a relatively small number of parameters. The number, positions, presentation manners and connection manners of the class codes 20, the method codes 22 and the attributes 26 shown in FIG. 3B are only described as an exemplary example of this embodiment, but are not intended to limit the present invention.

Optionally, the display device 15 may continuously display the first layer 40 of the hierarchical structure and selectively display the second layer 42 of the hierarchical structure. For example, the display device 15 may initially present the plurality of class codes 20 and related information thereof as shown in FIG. 3A; and after a certain class code 20 shown in FIG. 3A is clicked by a user, the display device 15 then unfolds the method codes 22, the attributes 26 and the related information comprised in the class code 20 that is clicked in a manner as shown in FIG. 3B. If the user clicks the unfolded class code 20 another time, then the display device 15 will present the class codes 20 and the related information thereof again in a manner as shown in FIG. 3A.

In other embodiments, the visualization structure created by the processing device 13 for the software program 111 may further comprise a third layer (not shown). Specifically, when the user clicks a certain method code 22 shown in FIG. 3B, a source code of the method code 22 may be displayed on the third layer; and if the user clicks the method code 22 another time, then the display returns to the content displayed by the second layer 42.

Figure 4A:
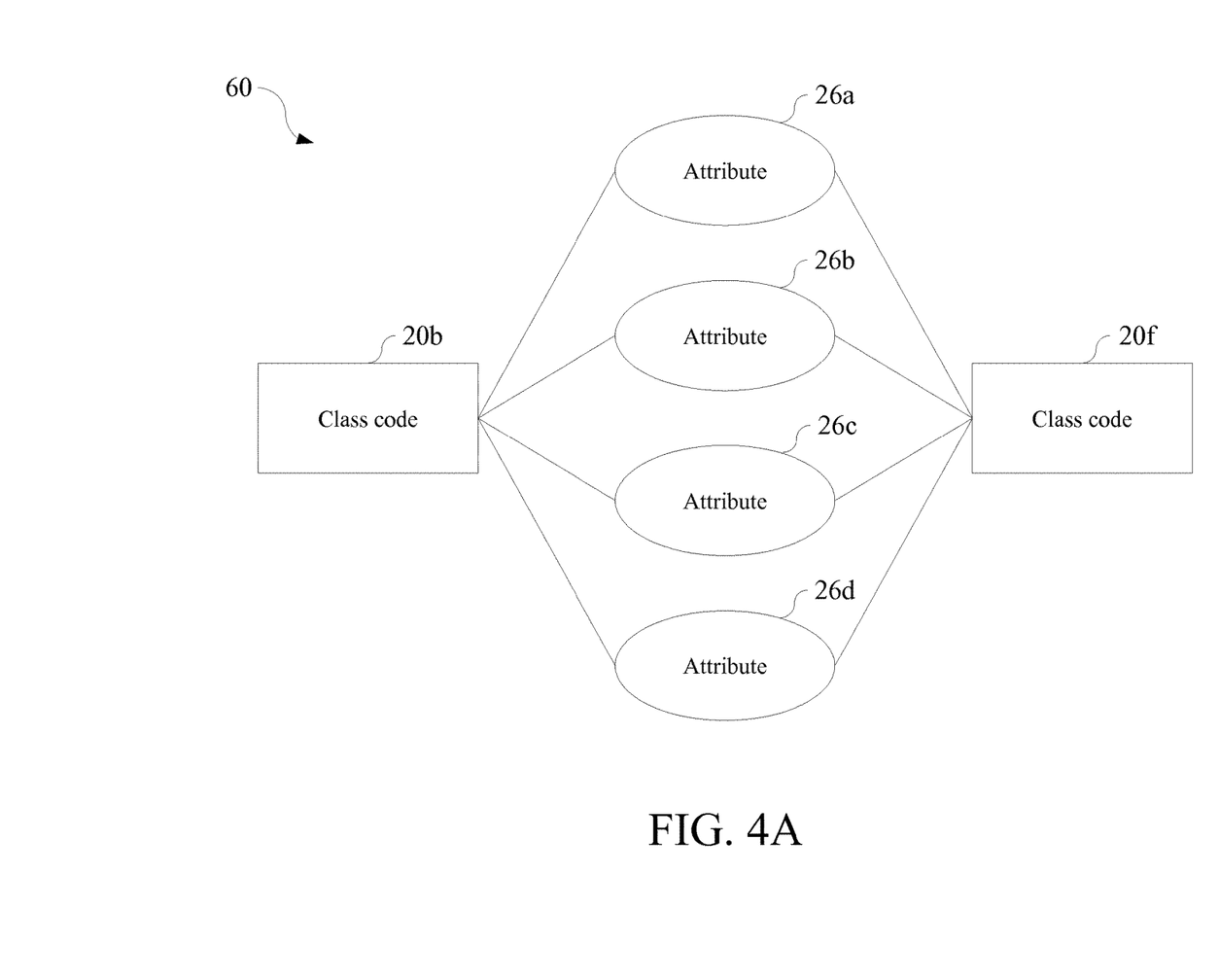
FIG. 4A is a schematic view illustrating a Data Clumps relevance according to an embodiment of the present invention.
Figure 4B:
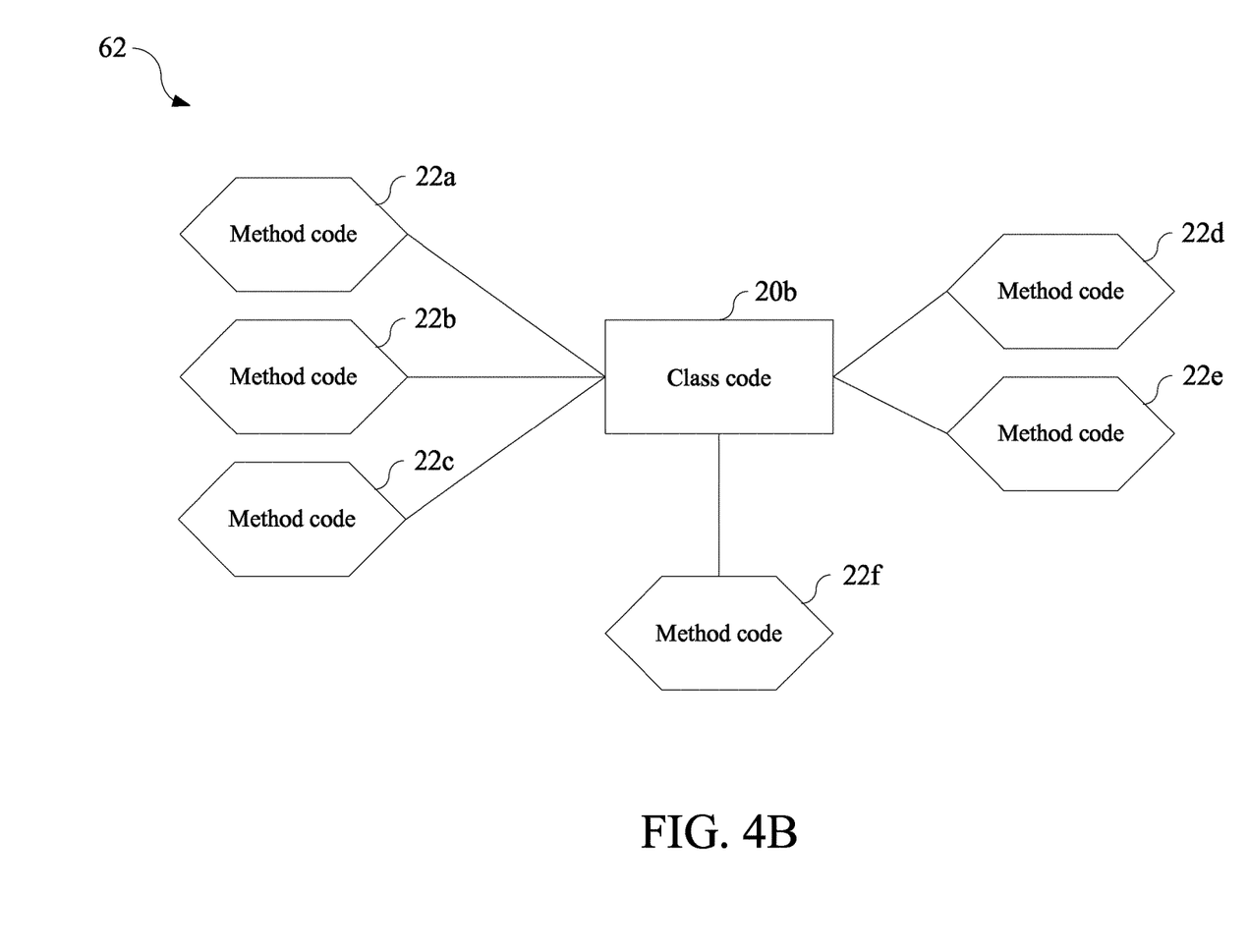
FIG. 4B is a schematic view illustrating a Divergence Change relevance according to an embodiment of the present invention.
Figure 4C:
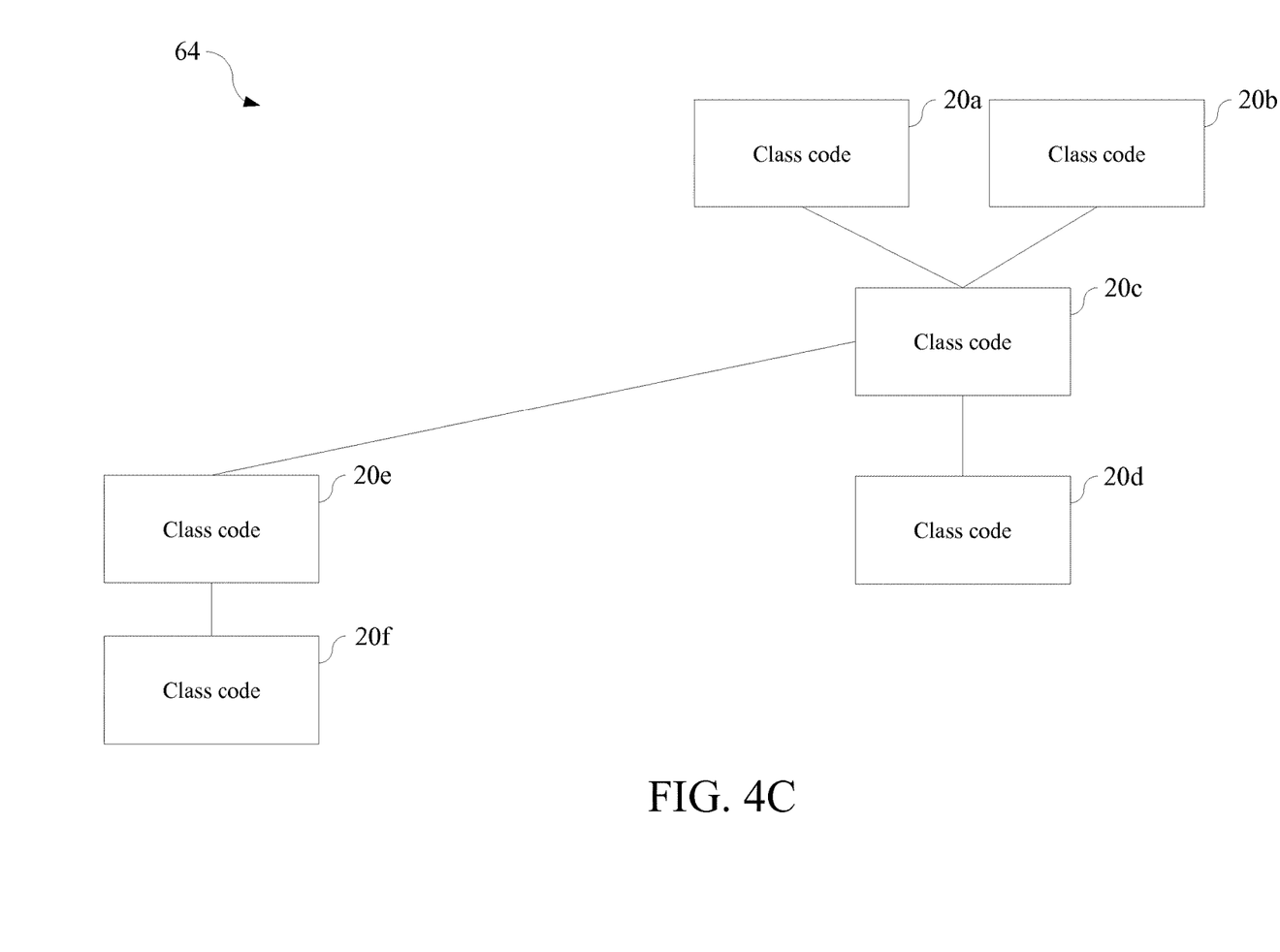
FIG. 4C is a schematic view illustrating a Shotgun Surgery relevance according to an embodiment of the present invention.

When coupling and cohesion occur in the software program 111, a Data Clumps relevance 60 shown in FIG. 4A, a Divergence Change relevance 62 shown in FIG. 4B and a Shotgun Surgery relevance 64 shown in FIG. 4C may be incorporated into the visualization structure created by the processing device 13 for the software program 111 to highlight the regions where the coupling and cohesion occur in the software program 111. The content shown in FIGS. 4A~4B is only described as an example of this embodiment, but is not intended to limit the present invention.

For the software program 111, the processing device 13 may create a Data Clumps relevance for attributes that are identical among different class codes 20 according to the aforesaid data clumps information. For example, as shown in FIG. 4A, assume that the processing device 13 determines that the same attributes between the class code 20b and the class code 20f are attributes 26a, 26b, 26c and 26d. Then, the processing device 13 determines that there is a Data Clumps phenomenon occurs in the software program 111 and connects the class code 20b, the class code 20f and the attributes 26a~26d to create a Data Clumps relevance 60. Then, the Data Clumps relevance 60 will be incorporated into the visualization structure created by the processing device 13 for the software program 111, and the display device 15 will display the Data Clumps relevance 60 together when displaying the visualization structure.

For the software program 111, the processing device 13 may create a Divergence Change relevance for a plurality of method codes having the same change in each of the class codes 20 according to the aforesaid Divergence Change information. For example, as shown in FIG. 4B, assume that the processing device 13 finds, according to the change logs 113, that the method codes 22a, 22b and 22c have a same change (e.g., have once been commonly modified, updated, debugged or the like) and the method codes 22d and 22e have a same change (e.g., have once been commonly modified, updated, debugged or the like) in the class code 20b. Then, the processing device 13 determines that there is a Divergence Change phenomenon occurring in the software program 111, and groups the method codes 22a~22c that have a same change into a first group, groups the method codes 22d~22e that have a same change into a second group, and groups the method code 22f into a third group to create a Divergence Change relevance 62. Method codes 22 that belong to a same group are disposed adjacent to each other to be separated from other groups. Then, the Divergence Change relevance 62 will be incorporated into the visualization structure created by the processing device 13 for the software program 111, and the display device 15 will display the Divergence Change relevance 62 together when displaying the visualization structure.

For the software program 111, the processing device 13 may create a Shotgun Surgery relevance for a plurality of class codes 20 having the same change according to the aforesaid Shotgun Surgery information. For example, as shown in FIG. 4C, assume that the processing device 13 finds, according to the change logs 113, that the class codes 20a, 20b, 20c and 20d have a same change (e.g., have once been commonly modified, updated, debugged or the like) and the class codes 20e and 20f have a same change (e.g., have once been commonly modified, updated, debugged or the like). Then, the processing device 13 determines that there is a Shotgun Surgery phenomenon occurring in the software program 111, and groups the class codes 20a~20d that have a same change into a first group and groups the class codes 20e~20f as a second group to create a Shotgun Surgery relevance 64. Class codes 20 that belong to a same group are disposed adjacent to each other to be separated from other groups. Then, the Shotgun Surgery relevance 64 will be incorporated into the visualization structure created by the processing device 13 for the software program 111, and the display device 15 will display the Shotgun Surgery relevance 64 together when displaying the visualization structure.

Figure 5:
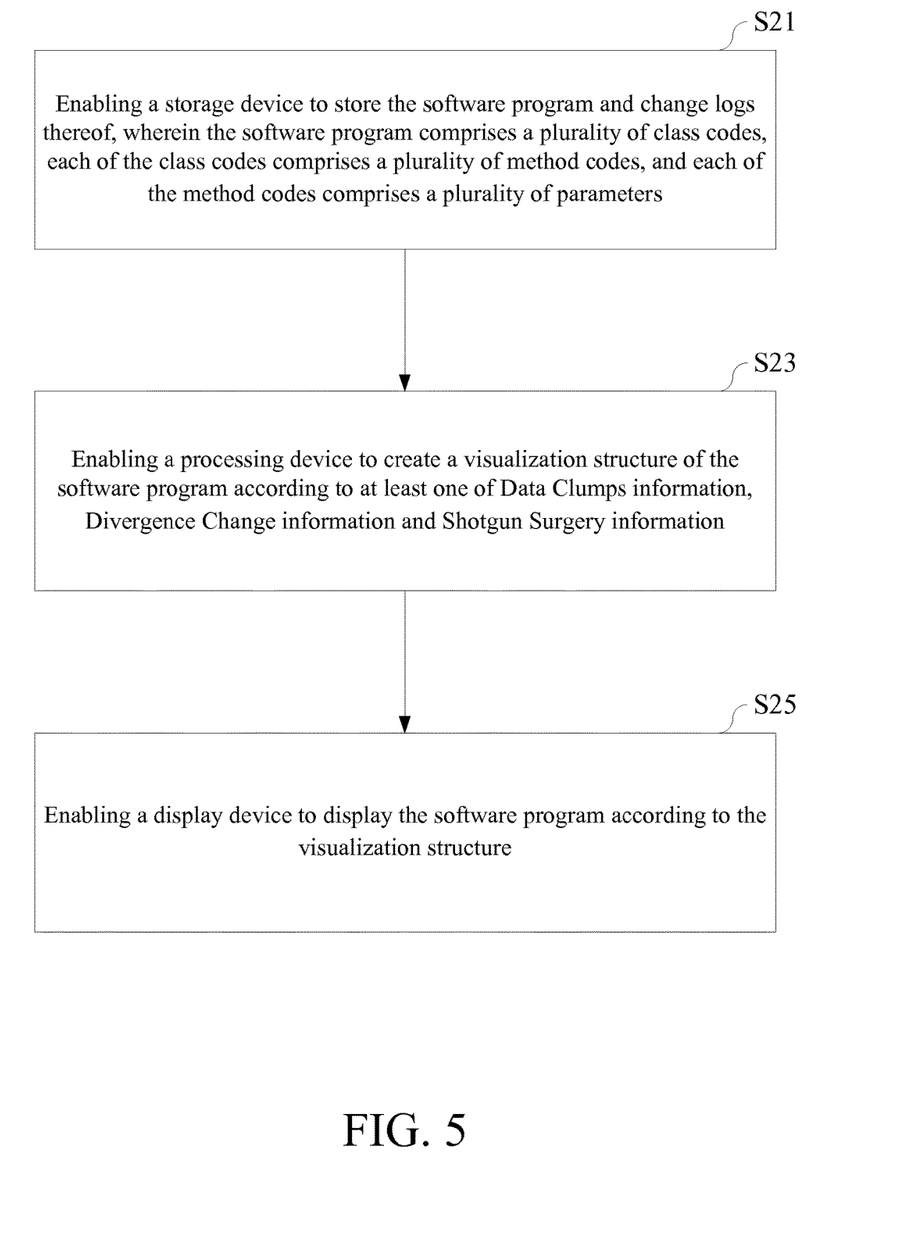
FIG. 5 is a schematic view illustrating a method for visualizing a software program according to an embodiment of the present invention.

Another embodiment of the present invention (briefly called "a second embodiment") is a method for visualizing a software program. FIG. 5 is a schematic view illustrating the method disclosed in the second embodiment. As shown in FIG. 5, the method disclosed in this embodiment comprises the following steps: a step S21 of enabling a storage device to store the software program and change logs thereof, wherein the software program comprises a plurality of class codes, each of the class codes comprises a plurality of method codes, and each of the method codes comprises a plurality of parameters; a step S23 of enabling a processing device to create a visualization structure of the software program according to at least one of Data Clumps information, Divergence Change information and Shotgun Surgery information, wherein the processing device calculates correlations between attributes of the class codes to detect Data Clumps of the software program and obtain the Data Clumps information therefrom, calculates correlations between the method codes according to the change logs to detect a divergence change of the software program and obtain the divergence change information therefrom, and calculates correlations between the class codes according to the change logs to detect Shotgun Surgery of the software program and obtain the Shotgun Surgery information therefrom; and a step S25 of enabling a display device to display the software program according to the visualization structure.

The storage device, processing device and display device described in the steps S21~S25 may substantially correspond to the storage device 11, the processing device 13 and the display device 15 of the aforesaid embodiment respectively. Additionally, the order in which the steps S21~S25 are presented is not intended to limit the present invention, and may be adjusted appropriately without departing from the spirits of the present invention.

As an exemplary example of this embodiment, the step S23 further comprises the following step: enabling the processing device to create a Data Clumps relevance for attributes that are identical among different class codes according to the Data Clumps information, create a Divergence Change relevance for a plurality of method codes having a same change in a class code according to the Divergence Change information, create a Shotgun Surgery relevance for a plurality of class codes having a same change according to the Shotgun Surgery information, and incorporate at least one of the Data Clumps relevance, the Divergence Change relevance and the Shotgun Surgery relevance into the visualization structure.

As an exemplary example of this embodiment, the storage device comprises a database which stores at least one open software program corresponding to the software program. Additionally, the step S23 further comprises the following step: enabling the processing device to further define at least one threshold according to the number of columns of each of the class codes, the number of columns of each of the method codes, the number of parameters comprised in each of the method codes and the number of attributes that are identical among different class codes in the at least one open software program, and only when a corresponding portion of the software program exceeds the at least one threshold, create the visualization structure according to at least one of the Data Clumps information, the Divergence Change information and the Shotgun Surgery information.

As an exemplary example of this embodiment, the processing device calculates the correlations between attributes of the class codes, the correlations between the method codes and the correlations between the class codes in series or in parallel.

As an exemplary example of this embodiment, the visualization structure is a hierarchical structure, the class codes of the software program correspond to a first layer of the hierarchical structure, and the method codes, the parameters and the attributes correspond to a second layer of the hierarchical structure.

As an exemplary example of this embodiment, the visualization structure is a hierarchical structure, the class codes of the software program correspond to a first layer of the hierarchical structure, and the method codes, the parameters and the attributes correspond to a second layer of the hierarchical structure. Additionally, the display device continuously displays the first layer of the hierarchical structure and selectively displays the second layer of the hierarchical structure.

As an exemplary example of this embodiment, the visualization structure is a hierarchical structure, the class codes of the software program correspond to a first layer of the hierarchical structure, and the method codes, the parameters and the attributes correspond to a second layer of the hierarchical structure. Additionally, the display device displays the hierarchical structure according to colors, frame lines, connection lines and outlines.

The method disclosed in the second embodiment substantially comprises the steps corresponding to all the operations of the system 1 disclosed in the first embodiment. Because the corresponding steps not described in the second embodiment can be readily understood by those of ordinary skill in the art of the present invention according to related disclosures of the aforesaid embodiment, they will not be further described herein.

According to the above descriptions, the present invention provides a system and a method for visualizing a software program. The system and the method according to the present invention can create a visualization structure of a software program according to at least one of Data Clumps information, Divergence Change information and Shotgun Surgery information, and display the software program according to the visualization structure. Because Divergence Change is a main reason why cohesion occurs in a software program, regions where the cohesion occurs in the software program can be effectively highlighted in the visualization structure created by the present invention according to the Divergence Change information. Additionally, because Data Clumps and Shotgun Surgery are main reasons why coupling occurs in a software program, regions where the coupling occurs in the software program can be effectively highlighted in the visualization structure created by the present invention according to the Data Clumps information and the Shotgun Surgery information. Accordingly, the present invention can provide an effective software visualization technology for large-scale software programs.

The above disclosure is related to the detailed technical contents and inventive features thereof. Persons skilled in the art may proceed with a variety of modifications and replacements based on the disclosures and suggestions of the invention as described without departing from the characteristics thereof. Although such modifications and replacements are not fully disclosed in the above descriptions, they have substantially been covered in the following claims as appended.

What is claimed is:
1. A method for visualizing a software program, comprising the following steps:
(a) a storage device storing the software program and change logs thereof, wherein the software program comprises a plurality of class codes, each of the class codes comprises a plurality of method codes, and each of the method codes comprises a plurality of parameters;
(b) a processing device creating a visualization structure of the software program according to at least one of Data Clumps information, Divergence Change information and Shotgun Surgery information, wherein the processing device calculates correlations between attributes of the class codes to detect Data Clumps of the software program and obtain the Data Clumps information therefrom, calculates correlations between the method codes according to the change logs to detect Divergence Change of the software program and obtain the Divergence Change information therefrom, and calculates correlations between the class codes according to the change logs to detect Shotgun Surgery of the software program and obtain the Shotgun Surgery information therefrom; and (c) a display device displaying the software program according to the visualization structure;

wherein the storage device comprises a database which stores at least one open software program corresponding to the software program, and the step (b) further comprises the following step: enabling the processing device to further uses the at least one open software program to analyze the software program to determine whether to create the visualization structure of the software program by defining at least one threshold according to the number of columns of each of the class codes, the number of columns of each of the method codes, the number of parameters comprised in each of the method codes and the number of attributes that are identical among the class codes in the at least one open software program and comparing a corresponding portion of the software program with the at least one threshold, and only when the corresponding portion of the software program exceeds the at least one threshold, the processing device create the visualization structure according to at least one of the Data Clumps information, the Divergence Change information and the Shotgun Surgery information, and wherein the step (b) further comprises the processing device creating a Data Clumps relevance for attributes that are identical among different class codes according to the Data Clumps information, creating a Divergence Change relevance for a plurality of method codes having a same change in a class code according to the Divergence Change information, creating a Shotgun Surgery relevance for a plurality of class codes having a same change according to the Shotgun Surgery information, and incorporating at least one of the Data Clumps relevance, the Divergence Change relevance and the Shotgun Surgery relevance into the visualization structure.

2. The method as claimed in claim 1, wherein the processing device calculates the correlations between attributes of the class codes, the correlations between the method codes and the correlations between the class codes in series or in parallel.

3. The method as claimed in claim 1, wherein the visualization structure is a hierarchical structure, the class codes of the software program correspond to a first layer of the hierarchical structure, and the method codes, the parameters and the attributes of the software program correspond to a second layer of the hierarchical structure.

4. The method as claimed in claim 3, wherein the display device continuously displays the first layer of the hierarchical structure and selectively displays the second layer of the hierarchical structure.

5. The method as claimed in claim 3, wherein the display device further displays the hierarchical structure according to colors, frame lines, connection lines and outlines.

6. A system for visualizing a software program, comprising:

a storage device, being configured to store the software program and change logs thereof, wherein the software program comprises a plurality of class codes, each of the class codes comprises a plurality of method codes, and each of the method codes comprises a plurality of parameters;

a processing device, being configured to create a visualization structure of the software program according to at least one of Data Clumps information, Divergence Change information and Shotgun Surgery information; and a display device, being configured to display the software program according to the visualization structure;

wherein the processing device calculates correlations between attributes of the class codes to detect Data Clumps of the software program and obtain the Data Clumps information therefrom, calculates correlations between the method codes according to the change logs to detect Divergence Change of the software program and obtain the Divergence Change information therefrom, and calculates correlations between the class codes according to the change logs to detect Shotgun Surgery of the software program and obtain the Shotgun Surgery information therefrom;

wherein the storage device comprises a database which stores at least one open software program corresponding to the software program, and the processing device further uses the at least one open software program to analyze the software program to determine whether to create the visualization structure of the software program by defining at least one threshold according to the number of columns of each of the class codes, the number of columns of each of the method codes, the number of parameters comprised in each of the method codes and the number of attributes that are identical among the class codes in the at least one open software program and comparing a corresponding portion of the software program with the at least one threshold, and only when the corresponding portion of the software program exceeds the at least one threshold, the processing device creates the visualization structure according to at least one of the Data Clumps information, the Divergence Change information and the Shotgun Surgery information, and wherein the processing device creates a Data Clumps relevance for attributes that are identical among different class codes according to the Data Clumps information, creates a Divergence Change relevance for a plurality of method codes having a same change in a class code according to the Divergence Change information, creates a Shotgun Surgery relevance for a plurality of class codes having a same change according to the Shotgun Surgery information, and incorporates at least one of the Data Clumps relevance, the Divergence Change relevance and the Shotgun Surgery relevance into the visualization structure.

7. The system as claimed in claim 6, wherein the processing device calculates the correlations between attributes of the class codes, the correlations between the method codes and the correlations between the class codes in series or in parallel.

8. The system as claimed in claim 6, wherein the visualization structure is a hierarchical structure, the class codes of the software program correspond to a first layer of the hierarchical structure, and the method codes, the parameters and the attributes of the software program correspond to a second layer of the hierarchical structure.

9. The system as claimed in claim 8, wherein the display device continuously displays the first layer of the hierarchical structure and selectively displays the second layer of the hierarchical structure.

10. The system as claimed in claim 8, wherein the display device further displays the hierarchical structure according to colors, frame lines, connection lines and outlines.

* * * * *